(No Model.)
W. A. KERFOOT.
DEVICE FOR ARTIFICIALLY FEEDING YOUNG ANIMALS.
No. 486,163. Patented Nov. 15, 1892.
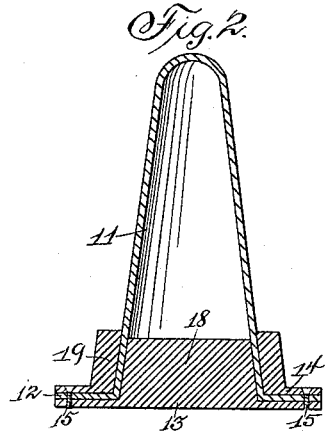
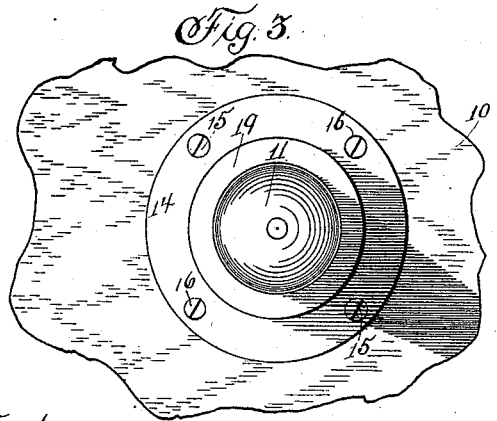
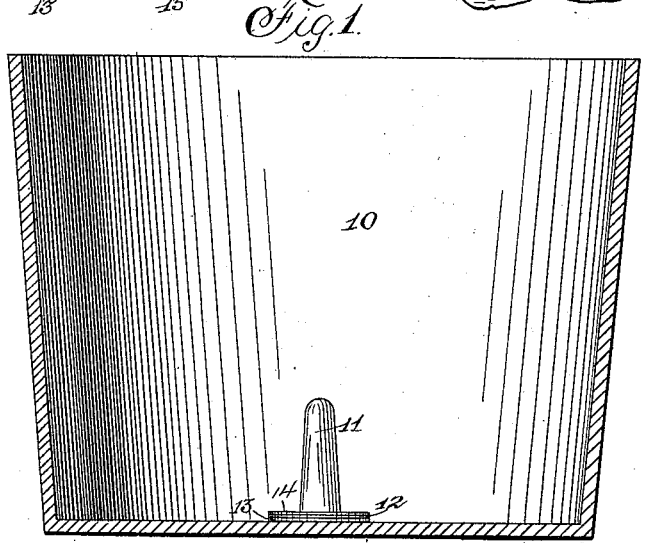
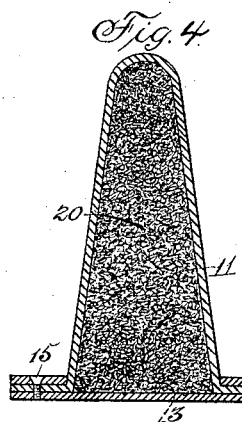
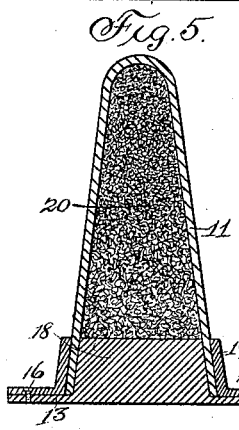
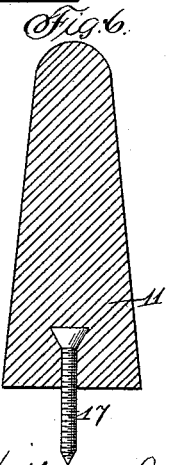
Witnesses
F. C. Tate.
J. C. Tate.
William A. Kerfoot,
by Bulkley & Sweet,
his Atty's

UNITED STATES PATENT OFFICE.

WILLIAM A. KERFOOT, OF DES MOINES, IOWA.

DEVICE FOR ARTIFICIALLY FEEDING YOUNG ANIMALS.

SPECIFICATION forming part of Letters Patent No. 486,163, dated November 15, 1892.

Application filed October 1, 1891. Serial No. 407,479. (No model.)

*To all whom it may concern:*

Be it known that I, WILLIAM A. KERFOOT, a citizen of the United States, and a resident of Des Moines, in the county of Polk and State of Iowa, have invented a new and useful Apparatus for Feeding Artificially the Young of Mammalian Animals, set forth in the annexed specification.

This invention has for its object the provision of means by which those conditions essential to the exercise of the suckling instinct of the young of mammals are supplied.

The invention consists in the combination, with an open containing-vessel, of an artificial teat or analogous device entirely or partially submerged in the food to be consumed in the contained vessel, so that the said food is exposed both to the senses of sight and smell of the animal.

My invention consists, further, in the combination, with a containing-vessel and food therein, of an artificial teat located within said containing-vessel, the interior of which teat is inaccessible to said food, so that those effects which are calculated to cause repugnance to the animal are avoided.

My invention consists, further, in the combination, with a containing-vessel, of means for securing readily an artificial teat detachably within said containing-vessel within convenient reach of the animal.

My invention consists, further, in the combination, with a containing-vessel and liquid food therein, of an artificial teat secured within said vessel, of yielding, compressible, and elastic material, which teat presents a uniformly-unbroken exterior, the interior being inaccessible to the food.

My invention consists, further, in certain details of construction more particularly to be described, reference being now had to the accompanying drawings, in which—

Figure 1 is a transverse sectional view representing the complete apparatus. Fig. 2 is a transverse sectional view in detail of the artificial teat and the means employed to attach the same to the containing-vessel. Fig. 3 is a plan view of the apparatus. Figs. 4, 5, and 6 are vertical transverse sectional views of different forms of artificial teats and securing devices.

In the construction of the device, as shown, the numeral 10 designates a containing-vessel partially filled with liquid food. An artificial teat 11, preferably made of india-rubber and having a flange 12 formed integrally on its lower end, is centrally located on the upper surface of the bottom of the containing-vessel 10. A base-plate 13 is interposed between said teat 11 and the bottom of the containing-vessel, and an annular ring 14 is superimposed about the said teat 11 above the flange 12. Binding-screws 15 connect the annular ring 14 with the base-plate 13, said screws passing through perforations in the said ring and seated in screw-threaded perforations in the base-plate. Securing-screws 16 are passed through coinciding perforations in the ring and base-plate and screwed into the wooden bottom of the containing-vessel. The artificial teat 11 is hollow, and the only means of access to the interior thereof is through its open lower end when detached.

In Fig. 6 the teat 11 is solid and the integral flange is omitted, said teat being secured to the bottom of the containing-vessel by means of a screw 17. The head of the screw 17 is molded within the lower end of the teat 11 when the same is formed, the threaded portion of said screw projecting from the teat and adapted for insertion into the bottom of the containing-vessel.

In Fig. 5 the teat 11 is hollow. The base-plate 13 is provided with an integral projection 18, which extends upward a short distance within the interior of said teat. The annular ring 14 is provided with an integral upwardly-extending flange 19, which surrounds the teat 11 and binds the same against the projection 18 on the base-plate. The hollow teats are preferably filled with a sponge or other suitable compressible elastic substance, as indicated by the numeral 20.

The operation of my apparatus is as follows: It has been demonstrated by practical experience that the raising of the young of domestic animals—such as cattle and horses—artificially is attended with great difficulty, owing to the inability of the animals to drink when of tender age, their natural instinct actuating them to draw their sustenance from the udder of the mother by the operation of suckling. Resort has been had to numerous mechanical appliances and methods to supply the conditions necessary to the exercise of the said instinct of the young mammal, all of which are expensive, complicated, and requiring considerable care and labor in their use. It is well known that when a suckling animal is presented with natural milk the instinct causes a recognition of the character of the food, and in endeavoring to obtain at once the whole of this food the animal immediately plunges its nose to the bottom of the containing-vessel, if the said vessel be open-ended, and unless some artifical means be presented the vessel will be upset and its contents lost, since the animal is unable to drink. In view of these facts it will be seen that when the nose of the animal comes in contact with the centrally-located artificial teat of yielding material he immediately seizes upon and utilizes the same to convey the food into the mouth by suckling, the food passing into the mouth upwardly on each side of the teat. It is evident that by this means of feeding the animal can secure the desired quantity of food in less time than if he nursed directly from the mother, thus accomplishing the much-desired result of weaning the young from its mother. A further advantage of this means of feeding resides in the fact that the food may be varied to suit the convenience and desire of the attendant—as, for instance, bran or other ground food can be mixed with the milk and will pass readily into the mouth of the animal, whereas in the practical use of ordinary suckling-nipples and flexible tubes any thickening of the milk would clog the passages in the apparatus. Owing to the construction of the artificial teat in such a manner as that the food cannot enter the same, the liability of the parts to become distasteful to the animal by reason of the accumulation of fermented food or foreign substances within the teat is avoided. It is evident, further, that owing to the construction of the base-plate and ring and the positioning of the same relative to the teat a secure detachable fastening for the same is provided, which also serves to exclude the food from the only opening in the said teat and insures cleanliness of the parts where the teat is formed with a hollow interior.

Having thus described my invention, what I claim as new therein, and desire to secure by Letters Patent, is—

1. An apparatus for artificially feeding the young of mammalian animals, which consists in a containing-vessel having an open end, and an imperforate artificial teat located and secured within said containing-vessel, which teat within said vessel is adapted to be partially or wholly surrounded by food.

2. In an apparatus for artificially feeding the young of mammalian animals, the combination, with an open-ended containing-vessel, of an imperforate artificial teat located within said containing-vessel, which teat is made of yielding compressible elastic material and presents a uniformly unbroken exterior surface.

WILLIAM A. KERFOOT.

Witnesses:
WM. M. WILCOXEN,
S. C. SWEET.